United States Patent [19]

Bennett

[11] 4,175,450
[45] Nov. 27, 1979

[54] MOTION TRANSMITTING REMOTE CONTROL ASSEMBLY

[75] Inventor: William G. Bennett, Troy, Mich.

[73] Assignee: Teleflex Incorporated, Limerick, Pa.

[21] Appl. No.: 879,455

[22] Filed: Feb. 21, 1978

[51] Int. Cl.² .............................................. F16C 1/10
[52] U.S. Cl. .................................. 74/501 P; 74/501 R
[58] Field of Search ............... 24/206 R, 211 R; 85/7; 248/17, 18, 56; 292/156, 162, 175; 339/91, 126; 74/501 R, 501 P, 501.5 R; 285/298

[56] References Cited

U.S. PATENT DOCUMENTS

| | | | |
|---|---|---|---|
| 2,994,935 | 8/1961 | Buchholz | 24/206 R |
| 3,393,578 | 7/1968 | Tschanz | 74/501 P |
| 3,572,159 | 3/1971 | Tschanz | 74/501 |
| 3,662,617 | 5/1972 | Bennett | 74/501 R |
| 3,710,645 | 1/1973 | Bennett | 74/501 P |

Primary Examiner—Samuel Scott
Assistant Examiner—G. A. Anderson
Attorney, Agent, or Firm—McGlynn and Milton

[57] ABSTRACT

A motion transmitting remote control assembly of the type for transmitting forces along a curved path by a flexible motion transmitting core element movably supported within a conduit. An elongated adjustment member having teeth disposed on the bottom flat side of its irregular shaped cross section is attached to the conduit at one end and extends through a passageway in a support member adapted for attachment to a support structure. An L-shaped metal latch member is supported in a guideway in the support member and includes an aperture with a tooth extending along one edge of the aperture for engaging the teeth along the bottom of the adjustment member. A spring biases the latch member in a direction so that the tooth in the aperture thereof engages the teeth along the adjustment member. A pair of flanges extend into the passageway of the support member adjacent one end to define a generally T-shaped opening. The adjustment member has a conforming T-shaped cross section along a length thereof between a circular flange at one end and shoulders disposed along the length of the adjustment member whereby the longitudinal movement of the adjustment member is limited relative to the support member and the adjustment member is also prevented from being removed from the support member after initial assembly. The assembly allows the length of the conduit to change as the adjustment member moves longitudinally relative to the support member whereby the distance the core element extends from the end of the conduit may be adjusted, the adjustment being affected either manually or automatically in one direction as the teeth ratchet relative to one another.

12 Claims, 6 Drawing Figures

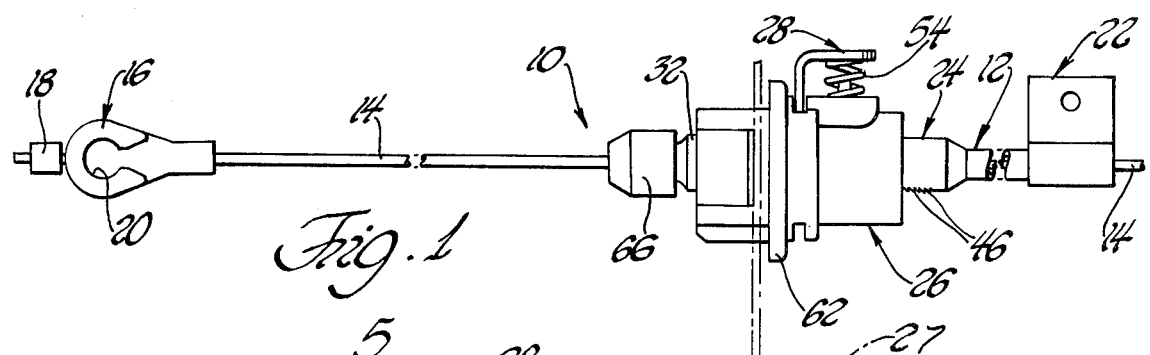
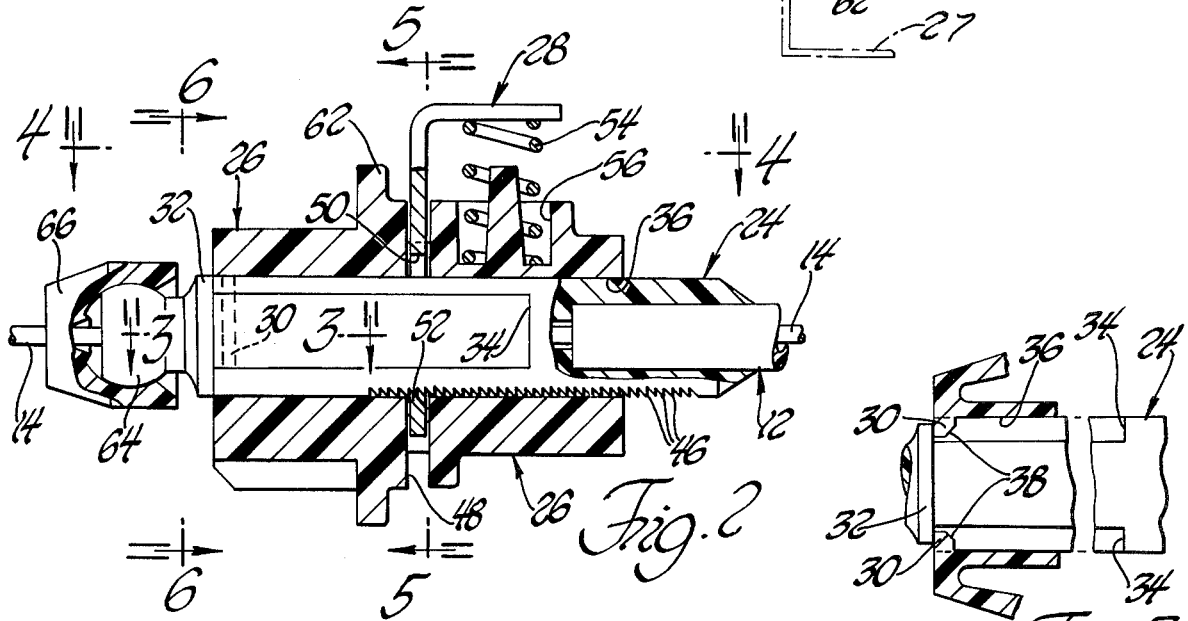
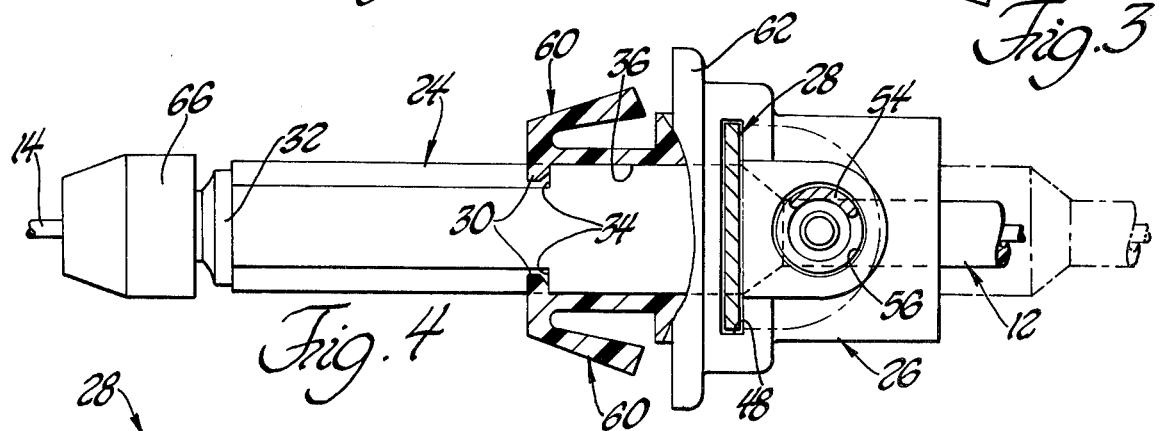
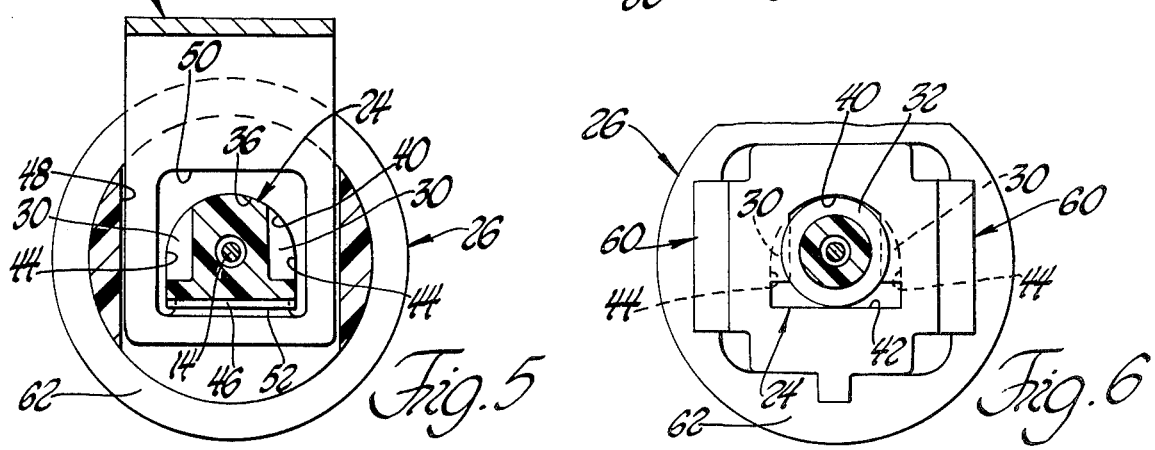

MOTION TRANSMITTING REMOTE CONTROL ASSEMBLY

BACKGROUND OF THE INVENTION

1. Field of the Invention

The subject invention relates to a motion transmitting remote control assembly of the type wherein motion is transmitted in a curved path by a flexible motion transmitting core element movably supported by a flexible conduit.

Such remote control assemblies normally include means adjacent each end of the conduit for attaching the conduit to a support structure with the core element extending from each end of the conduit. It is frequently desirable to adjust the length of the conduit to change the position of one end of the core element extending from the conduit once the assembly is installed. An example of such a situation is wherein a remote control assembly is utilized to interconnect the accelerator pedal and a carburetor operating lever arm in an automobile. In this situation, the assembly is usually installed by attaching the conduit to the body of the automobile adjacent the accelerator pedal while attaching the end of the core element extending therefrom to the accelerator pedal. The opposite end of the conduit is attached to a support structure adjacent the carburetor so that the other or opposite end of the core element may be attached to the operating lever of the carburetor. Frequently, however the end of the core element adjacent the carburetor does not extend from the conduit a proper amount for attachment to the operating lever of the carburetor. During such installation the accelerator pedal is in its unmoved or idle position as is the operating lever of the carburetor and if the end of the core element adjacent the operating lever of the carburetor is not positioned correctly, the operating lever of the carburetor must be moved for attachment to the core element so that the end result is that the accelerator pedal is in the idle position but the operating lever of the carburetor is not. The position of the end of the core element extending from the conduit, i.e., the distance the core element extends from the conduit, may be changed by altering the length of path over which the conduit extends.

2. Description of the Prior Art

There are assemblies known to the prior art wherein an adjustment in the length of the conduit may be accomplished in order to change the distance the core element extends from the end of the conduit during an installation procedure. Normally, such assemblies include a support member adapted for attachment to a support structure with an adjustment member movably supported by the support member for longitudinal movement and connected to the end of the conduit whereby the conduit effectively changes in length as the adjustment member moves relative to the support member. Frequently, the support member movably supports a locking or latching member which engages the adjustment member to control the longitudinal movement of the adjustment member relative to the support member. An annoyance associated with the prior art assemblies is that during shipment and during installation the adjustment member may be disengaged from the support member. Such a disengagement can reduce efficiency in certain situations during the assembly of automobiles on automotive assembly lines.

SUMMARY OF THE INVENTION

The subject invention relates to a motion transmitting remote control assembly for transmitting forces along a curved path by a flexible motion transmitting core element movably supported in a conduit. The end of the core element extend from the ends of the conduit and a fitting is disposed adjacent a first end of the conduit for attaching the conduit to a support structure. An adjustment means is attached to the conduit adjacent the other end and a support means adapted for attachment to a support structure movably supports the adjustment means. A locking means supported by the support means for movement between engaged and disengaged positions controls relative movement between the adjustment means and the support means in a direction longitudinally of the conduit when in the engaged position. The adjustment means and the support means includes retaining means for preventing removal of the adjustment means from the support means. The support means includes a passageway extending therethrough, the adjustment means slidably supported in the passageway and with the retaining means including at least one flange extending into the passageway from the support means and first and second spaced abutments extending radially from the adjustment means and disposed on opposite sides of the flange for limiting movement of the adjustment means in the passageway and preventing the removal of the adjustment means from the support means.

PRIOR ART STATEMENT

The broad concept of accomplishing an adjustment in the length of the conduit is shown in U.S. Pat. No. 3,289,491 granted Dec. 6, 1966 in the name of Winthrop B. Conrad and U.S. Pat. No. 3,393,578 granted July 23, 1968 in the name of August E. Tschanz, both of which are assigned to the assignee of the subject invention. The assemblies shown in these patents employ rotative threaded members which are manually rotated to gradually change the length of the conduit. Another remote control assembly for accomplishing such an adjustment is shown in U.S. Pat. No. 3,572,159 granted Mar. 23, 1971 in the name of August E. Tschanz and assigned to the assignee of the subject invention. This latter patent discloses an assembly with an adjustment member disposed on the end of the conduit and extending through a passageway in a support member adapted for attachment to a support structure and with a locking member movable between locked and unlocked positions for respectfully preventing and allowing relative movement between the adjustment member and the support member. Still further examples of remote control assemblies allowing such adjustment are illustrated in U.S. Pat. No. 3,662,617 granted May 16, 1972 in the name of William G. Bennett, et al. and U.S. Pat. No. 3,710,645 granted Jan. 16, 1973 in the name of William G. Bennett, both of which are assigned to the assignee of the subject invention. These patents disclose assemblies wherein the length of the conduit may be adjusted automatically upon movement of the core element.

All of the above-described prior art assemblies have proven to be very satisfactory and are well suited for certain purposes; however, there is a need for yet another such adjusting remote control assembly wherein the adjusting assembly may be assembled to allow adjustment of the length of the conduit yet which may not be disassembled, an objective which is accomplished by the subject invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view of a preferred embodiment of the subject invention;

FIG. 2 is an enlarged cross-sectional view of a preferred embodiment of the subject invention;

FIG. 3 is a fragmentary cross-sectional view taken substantially along line 3—3 of FIG. 2;

FIG. 4 is a fragmentary cross-sectional view taken substantially along line 4—4 of FIG. 2 but with a further portion broken away and in cross section;

FIG. 5 is a cross-sectional view taken substantially along line 5—5 of FIG. 2; and FIG. 6 is a cross-sectional view taken substantially along line 6—6 of FIG. 2.

DESCRIPTION OF PREFERRED EMBODIMENT

A motion transmitting remote control assembly constructed in accordance with the instant invention is generally shown at 10.

The motion transmitting remote control assembly 10 includes a conduit generally indicated at 12. The conduit 12 is preferably of the well known type including an inner tubular member made of organic polymeric material and surrounded by a plurality of long lay wires disposed helically thereabout with a casing of organic polymeric material disposed about the long lay wires and about the inner tubular member. The conduit 12 is flexible along its length.

A motion transmitting core element 14 is movably supported by the conduit 12 with the ends thereof extending from the ends of the conduit 12. The motion transmitting core element 14 is a wire member, as illustrated, but also may comprise metal strands helically wound together in cable-like fashion. A coupling member or terminal generally indicated at 16 is disposed upon the end of the core element for attachment of the core element to an operated or operating member. A slug 18 retains the terminal member 16 upon the core element 14. The opposite end of the core element may include a similar terminal as that shown at 16. The terminal member 16 is slidable along the core element 14 and includes a pocket 20 for receiving the head of a pin, or the like, extending from an operated or operating member.

A fitting generally indicated at 22 in FIG. 1 is attached to one end of the conduit 12 and is adapted by a flange and a hole therein for attaching the conduit 12 to a support structure, such as the body of a vehicle.

An adjustment means is generally indicated at 24 and is attached to the conduit 12 adjacent a second end thereof.

The assembly also includes a support means generally indicated at 26 and adapted for attachment to a support structure such as the supporting bracket 27 shown in phantom in FIG. 1. The support means 26 movably supports the adjustment means 24.

The assembly also includes a locking means comprising the L-shaped latch member generally indicated at 28. The locking means 28 is supported by the support means 26 for movement between engaged and disengaged positions for controlling the relative movement between the adjustment means 24 and the support means 26 in a direction longitudinally of the conduit 12 when in the engaged position illlustrated.

The adjustment means 24 and the support means 26 include retaining means comprising the flanges 30 and the abutments 32 and 34 for preventing removal of the adjustment means 24 from the support means 26. The support means 26 includes a passageway 36 extending therethrough between first and second ends. Adjustment means 24 comprises an elongated adjustment member slidably supported in the passageway 36. The flanges 30 of the retaining means extend into the passageway 36 from the support means 26. The support means 26 is preferably made of an organic polymeric or plastic material and the flanges 30 are integral therewith. The flanges 30 are oppositely disposed in the passageway 36 and are disposed at the second end of the passageway 36.

The first abutment 32 comprises a circular flange adjacent a first end of the elongated adjustment member 24. The circular flange 32 overlies the flanges 30, as best illustrated in FIG. 6.

The second abutments 34 are defined by shoulders disposed along the length of the elongated adjustment member 24. The abutments 32 and 34 extend radially from the adjustment member 24 and are disposed on opposite sides of the flanges 30 for limiting movement of the adjustment member 24 in the passageway 36 while at the same time preventing the removal of the adjustment member 24 from the support means 26.

The flanges 30, as best illustrated in FIGS. 3 and 4, include beveled faces as indicated at 38 in FIG. 3 for allowing the circular flange 32 to snap therepast during initial assertion of the adjustment member 24 into the passageway 36. In other words, as the adjustment member 24 is inserted into the first end of the support means 26 and into the passageway 36, the flange 32 is moved toward the beveled faces 38 of the flanges 30. Upon engaging the flanges 30 with the circular flange 32, the flanges 30 being made of plastic, are sufficiently resilient to allow the circular flange 30 to snap therepast. However, the circular flange 32 is prevented from reentering the passage 36 as the flange 32 overlies the flanges 30, as illustrated in FIG. 6.

The passageway 36 between the first end of the support member 26, which is the right end viewed in FIG. 2, and the second end or the position of the flanges 30, has a cross section including a semi-circular top 40 and a flat bottom 42 with parallel side 44 extending between the top 40 and the bottom 42. The flanges 30 extend into the passageway 36 from the sides thereof and each of the flanges 30 extends from the circular top 36 of the passageway along the sides downwardly to a position spaced above the bottom 42 of the passageway so that there is defined an irregular cross section which is generally T-shaped. In the same fashion, the adjustment member 24 between the circular flange 32 and the shoulders 34 thereof has a generally T-shaped irregular cross section which conforms to the T-shaped cross section defined by the flanges 30. In other words, the T-shaped irregular cross section of the adjustment member 24, as best illustrated in FIGS. 2, 3 and 4, extends from the circular flange 32 to the shoulders 34 which define the second abutments. The shoulders 34 are spaced from the second end of the adjustment member 24 which is attached to the conduit 12. The length of the adjustment member 24 between the second end thereof, which is attached to the conduit 12, and the shoulders 34 defining the second abutment means has a cross section conforming to the passageway 36, i.e., it has a semi-circular top with two parallel sides extending from the semi-circular top downwardly to a flat bottom. Thus, the shoulders 34 are oppositely disposed on opposite sides of the adjustment member 24.

The flat bottom of the adjustment member 24 includes a plurality of transversely extending teeth 46. The support means 26 includes a guideway 48 extending transversely through the passageway 36 and completely through the support means 26. The latch member 28 has one leg thereof movably supported in the guideway 48 for engaging the teeth 46. More specifically, the latch member 28 includes a rectangular aperture or opening 50 extending therethrough and surrounding the adjustment member 24. In other words, the adjustment member 24 extends through the aperture 50 in the latch member 28. The aperture 50 has a lower straight edge defining a tooth 52 for engaging the teeth 46 along the bottom of the adjustment member 24.

A biasing means comprising a coil spring 54 reacts between the support means 26 and the latch member 28 for urging the tooth 52 of the latch member 28 into engagement with the teeth 46 on the adjustment member 24. The latch member is an L-shaped metal member and the spring 54 engages one leg of the latch member 28, i.e., the leg opposite to that in which the aperture 50 is disposed. The support means 26 includes a pocket 56 with a central post therein for receiving the spring 54.

The tooth 50 on the latch member 28 and the teeth 46 on the adjustment member 24 are angled in one direction so as to have a ratcheting configuration for allowing movement of the adjustment member 24 in one direction, i.e., to the left, as viewed, when engaged by the latch member 28 while at the same time preventing such movement in the opposite direction or to the right while engaged by the latch member 28. Such a configuration of the teeth allow automatic longitudinal adjustment of the adjustment member 24 relative to the support means 26 in response to a force applied to the core element 14 to change the length of the effective length of the conduit 12.

Alternatively, the L-shaped latch member 28 may be manually depressed to compress the spring 54 to disengage the tube 52 from the teeth 46 to allow the adjustment member 24 to be manually moved longitudinally relative to the support means 26.

The support means 26 is adapted for attachment to a support structure, as it has integrally formed therewith a snap-in means generally indicated at 60 for insertion through an opening in a support member such as the bracket 27 to retain the support means 26 attached to the support bracket 27. Adjacent the snap-in means 60 is a large circular flange 62 which forms a part of the support means 26. The snap-in end means 60 may be of the type forming the subject matter of U.S. Pat. No. 3,427,894 granted to August E. Tschanz on Feb. 18, 1969 and assigned to the assignee of the subject invention.

The first end of the adjustment member 24 defines a spherical portion 64 upon which is disposed a plastic swivelling member 66 which wipes the core element 14 clean and swivels to accommodate movement of the extended length of the core element 14.

The invention has been described in an illustrative manner, and it is to be understood that the terminology which has been used is intended to be in the nature of words of description rather than of limitation.

The embodiments of the invention in which an exclusive property or privilege is claimed are defined as follows:

1. A motion transmitting remote control assembly comprising; a conduit, a core element movably supported by said conduit with the ends thereof extending from the ends of said conduit, a fitting adjacent a first end of said conduit for attaching said conduit to a support structure, adjustment means attached to said conduit adjacent the second end thereof, support means adapted for attachment to a support structure and movably supporting said adjustment means, locking means supported by said support means for movement between engaged and disengaged positions for controlling relative movement between said adjustment means and said support means in a direction longitudinally of said conduit when in said engaged position, said adjustment means and said support means including retaining means for preventing removal of said adjustment means for said support means, said support means including a passageway extending therethrough, said adjustment means being slidably supported in said passageway, said retaining means including at least one flange extending into said passageway from said support means and first and second spaced abutments extending radially from said adjustment means and disposed on opposite sides of said flange for limiting movement of said adjustment means in said passageway and preventing said removal of said adjustment means from said support means.

2. An assembly as set forth in claim 1 wherein said flange extends into said passageway and defines an irregular cross section in said passageway, said adjustment means having an irregular cross section conforming to said irregular cross section defined by said flange and extending along the length thereof between said spaced abutments.

3. An assembly as set forth in claim 2 wherein said flange includes a beveled face for allowing said first abutment to snap therepast during initial insertion of said adjustment means into said passageway.

4. An assembly as set forth in claim 3 including two of said flanges oppositely disposed in said passageway, said passageway having first and second ends, said flanges being disposed at said second end of said passageway.

5. An assembly as set forth in claim 4 wherein said passageway between said first end and said flanges has a cross section including a semi-circular top and a flat bottom with parallel sides extending between said top and said bottom.

6. An assembly as set forth in claim 5 wherein said flanges extend into said passageway from the sides thereof, each of said flanges extending downwardly from said circular top of said passageway to a position spaced above said bottom thereof so that said irregular cross section is generally T-shaped.

7. An assembly as set forth in claim 6 wherein said first abutment comprises a circular flange adjacent a first end of said adjustment means.

8. An assembly as set forth in claim 7 wherein said T-shaped irregular cross section of said adjustment means extends from said circular flange to said second abutment, said second abutment being spaced from the second end of said adjustment means, said adjustment means having a cross section between said second end thereof and said second abutment conforming to said passageway between said first end thereof and said flanges so that said second abutment comprises oppositely disposed shoulders.

9. An assembly as set forth in claim 8 wherein the flat bottom of said adjustment means includes a plurality of transversely extending teeth, said support means having a guideway extending transversely through said passageway, said locking means being movably supported in said guideway for engaging said teeth.

10. An assembly as set forth in claim 9 wherein said locking means comprises a latch member having an aperture therethrough with said adjustment means extending through said aperture, said aperture having a lower edge defining a tooth for engaging said teeth along said bottom of said adjustment means, and biasing means reacting between said support means and said latch member for urging said tooth of said latch member into engagement with said teeth on said adjustment means.

11. An assembly as set forth in claim 10 wherein said adjustment means and said support means are made of organic polymeric material and said latch member is an L-shaped metal member, said biasing means comprising a spring engaging one leg of said latch member with said aperture being in the opposite leg thereof.

12. An assembly as set forth in claim 11 wherein said tooth on said latch member and said teeth on said adjustment means have a ratcheting configuration for allowing movement of said adjustment means in one direction while engaged by said latch member and preventing such movement in the opposite direction while engaged by said latch member.

* * * * *